(12) United States Patent
Kvist et al.

(10) Patent No.: US 12,202,394 B2
(45) Date of Patent: Jan. 21, 2025

(54) MATERIAL TRANSPORTATION SYSTEM

(71) Applicant: Volvo Construction Equipment AB, Eskilstuna (SE)

(72) Inventors: Roland Kvist, Braås (SE); Tove Audhav, Landvetter (SE); Gordon Ekman, Moheda (SE); Joakim Haegerstam, Vrigstad (SE)

(73) Assignee: Volvo Construction Equipment AB, Eskilstuna (SE)

( * ) Notice: Subject to any disclaimer, the term of this patent is extended or adjusted under 35 U.S.C. 154(b) by 303 days.

(21) Appl. No.: 17/959,386

(22) Filed: Oct. 4, 2022

(65) Prior Publication Data
US 2023/0114716 A1    Apr. 13, 2023

(30) Foreign Application Priority Data

Oct. 8, 2021    (EP) .................................... 21201578

(51) Int. Cl.
 *B60P 1/28* (2006.01)
 *B60H 1/00* (2006.01)
 *B60L 1/00* (2006.01)
(52) U.S. Cl.
 CPC .......... *B60P 1/286* (2013.01); *B60H 1/00014* (2013.01); *B60H 1/00385* (2013.01); *B60L 1/00* (2013.01); *H01M 2220/20* (2013.01)
(58) Field of Classification Search
 CPC ... B60H 1/00014; B60H 1/00385; B60L 1/00; B60P 1/286; H01M 2220/20
 See application file for complete search history.

(56) References Cited

U.S. PATENT DOCUMENTS

| | | | | |
|---|---|---|---|---|
| 10,358,046 | B2* | 7/2019 | Myers | ..................... B60L 58/26 |
| 10,427,538 | B2* | 10/2019 | Myers | ....................... F25B 9/04 |
| 10,940,737 | B2* | 3/2021 | Kesani | .................... B60P 1/286 |
| 11,850,970 | B2* | 12/2023 | Zhang | ................. H01M 10/486 |
| 11,870,047 | B2* | 1/2024 | Pettersson | ........... H01M 10/633 |
| 2012/0169109 | A1 | 7/2012 | Rivera et al. | |
| 2013/0075170 | A1 | 3/2013 | Minoshima et al. | |
| 2013/0187435 | A1 | 7/2013 | Uranaka | |
| 2015/0001910 | A1 | 1/2015 | Natarajan et al. | |

(Continued)

FOREIGN PATENT DOCUMENTS

| | | |
|---|---|---|
| CN | 105711378 A | 6/2016 |
| CN | 107351647 A | 11/2017 |

(Continued)

OTHER PUBLICATIONS

Extended European Search Report, 21201578.8, mailed Apr. 7, 2021, 5 pages.

*Primary Examiner* — Ljiljana V. Ciric
(74) *Attorney, Agent, or Firm* — Sage Patent Group

(57) ABSTRACT

A material transportation system for a working machine is provided. The material transportation system comprises a load implement body with a plurality of air flow channels. The air flow channels comprise a set of heat insulated air flow channels, and a set of heat transfer channels, wherein each air flow channel of the set of heat insulated air flow channels comprises a heat insulating structure. When the temperature level of the load implement body is below a predetermined threshold limit, pressurized air is directed to the set of heat transfer channels.

14 Claims, 3 Drawing Sheets

(56) References Cited

U.S. PATENT DOCUMENTS

| | | | | |
|---|---|---|---|---|
| 2018/0290547 A1* | 10/2018 | Myers | ................ | F25B 9/04 |
| 2018/0290558 A1* | 10/2018 | Myers | ................ | B60K 11/02 |
| 2019/0214695 A1* | 7/2019 | Miura | ................ | B60K 11/04 |
| 2019/0389272 A1* | 12/2019 | Kesani | ............. | B60H 1/00014 |
| 2023/0102528 A1* | 3/2023 | Larsson | .............. | F16D 61/00 |
| | | | | 62/434 |
| 2023/0114716 A1* | 4/2023 | Kvist | ............. | B60H 1/00385 |
| | | | | 296/183.1 |
| 2023/0318081 A1* | 10/2023 | Yamamoto | ........... | H01M 10/63 |
| | | | | 429/72 |
| 2023/0344038 A1* | 10/2023 | Erhart | ............. | H01M 10/6554 |
| 2024/0154200 A1* | 5/2024 | Pettersson | ........... | H01M 10/625 |

FOREIGN PATENT DOCUMENTS

| | | | | | |
|---|---|---|---|---|---|
| CN | 113771648 | B | * | 2/2022 | ............ B60L 3/0046 |
| CN | 216916067 | U | * | 7/2022 | |
| DE | 112017004810 | T5 | * | 9/2019 | .............. B60K 1/00 |
| JP | 2012201227 | A | | 10/2012 | |
| WO | WO-2022250938 | A1 | * | 12/2022 | ......... B60H 1/00378 |

* cited by examiner

MATERIAL TRANSPORTATION SYSTEM

CROSS-REFERENCE TO RELATED APPLICATION

This application claims foreign priority to European Application No. 21201578.8 filed Oct. 8, 2021, the disclosure and content of which is incorporated by reference herein in its entirety.

TECHNICAL FIELD

The present invention relates to a material transportation system for a working machine. The present invention also relates to a working machine comprising such a material transportation and a method of controlling the material transportation system. Although the invention will mainly be directed to a working machine in the form of a hauler, the invention may also be applicable for other types of working machines and vehicles in need of heating a load implement body, such as e.g., a digger, a loader, etc., as well as trucks using some type of load implement in need of temperature control.

BACKGROUND

The propulsion systems of working machines are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy-duty vehicles.

Conventionally, for working machines propelled by an internal combustion engine (ICE), the exhaust gases exhausted from the ICE is used for heating a load implement body of the working machine. Such heating is desired to avoid the material from getting too cold and get sticky onto the body surface of the implement body.

However, for a working machine propelled by an electric machine, no exhaust gases are available for heating of the load implement body. It is therefore a desire to improve the heating of a load implement body for working machines operated and propelled by one or more electric machines.

SUMMARY

It is thus an object of the present invention to at least partially overcome the above-described deficiencies.

According to a first aspect, there is provided a material transportation system for a working machine, the material transportation system comprising an air blowing device arranged in an air conduit, a load implement body comprising an open box structure configured to receive a load material, wherein the load implement body comprises a plurality of air flow channels arranged in downstream fluid communication with the air conduit, the plurality of air flow channels comprising a set of heat insulated air flow channels, and a set of heat transfer channels, wherein each air flow channel of the set of heat insulated air flow channels comprises a heat insulating structure, an air flow direction device, the air flow direction device being arranged in the air conduit in fluid communication between the air blowing device and the plurality of air flow channels of the load implement body, wherein the air flow direction device is configured to controllably direct a flow of pressurized air from the air blowing device to the set of heat insulated air flow channels and/or to the set of heat transfer channels, and a control unit connected to the air flow direction device, the control unit comprising control circuitry configured to receive a signal indicative of a temperature level of the load implement body, compare the temperature level with a predetermined threshold limit; and control the air flow direction device to direct the flow of pressurized air from the air blowing device to the set of heat transfer channels when the temperature level of the load implement body is below the predetermined threshold limit.

The air blowing device should be construed as a device which is able to receive a flow of air, preferably ambient air, and to supply the air towards the air flow direction device. The air blowing device is preferably arranged to pressurize and heat the ambient air before the air is exhausted from the air blowing device. The air blowing device may thus be a fan. According to a preferred example embodiment, the air blowing device may be an air compressor. A variety of air blowing devices may thus be used and the specific type is preferably selected based on the application of use, i.e., the amount of heating required for the specific application and/or specific load implement body.

Further, the air flow direction device should be construed as an actuator which is configured to controllably direct the flow of air from the air blowing device to either or both of the set of heat insulated air flow channels and the set of heat transfer channels. The air flow direction device is preferably a valve, or a valve arrangement comprising a number of valves.

Still further, the heat transfer channels should be construed as channels or conduits which are arranged and positioned in the load implement body. The load implement body may, according to an example embodiment, be a dump body. The heat transfer channels transfer the heated air from the air blowing device to the load implement body for preventing the material arranged in the open box structure to fall below a certain temperature limit, i.e., the predetermined threshold limit. The heat transfer channels does hence not contain a heat insulating structure in the same sense as the heat insulating air flow channels.

The present invention is based on the insight that by dividing the plurality of air flow channels into a set of heat insulated air flow channels and a set of heat transfer channels, heating of the load implement body can be executed only when there is a need of heating. An advantage is that the load implement body is controlled to have a desired temperature. Moreover, the use of the air blowing device is of particular advantage as it reduces the need of using exhaust gases from an ICE, or alternative heat up concepts generating emissions, for heating the load implement body. The material transportation system is thus a particularly suitable heating arrangement for a working machine propelled by an electric traction motor and is thus more environmentally friendly compared to a heating system relying on combusted exhaust gases for heating.

According to an example embodiment, the control circuitry may be further configured to control the air flow direction device to prevent the flow of pressurized air to reach the set of heat insulated air flow channels when the temperature level of the load implement body is below the predetermined threshold limit. Hereby, as no flow is entering the heat insulated air flow channels, the load implement body is heated more rapidly.

According to an example embodiment, the control circuitry may be further configured to receive a signal indicative of an ambient air temperature, and adjust the predetermined threshold limit based on the ambient air temperature. An advantage is thus that a dynamic control system is provided, where the load implement body is heated based on the environmental air temperature conditions. Taking the ambient air temperature into account also serves the technical advantage of being able to abstain from heating the load implement body or heating the implement body to a less extent when the ambient air temperature conditions allow for this. The predetermined threshold limit may also be controlled by the operator of the vehicle. Thus, the operator can set the threshold to a desired limit while operating the working machine.

According to an example embodiment, the predetermined threshold limit may be a first predetermined threshold limit, wherein the control circuitry is further configured to compare the temperature level with a second predetermined threshold limit, the second predetermined threshold limit being higher than the first predetermined threshold limit.

According to an example embodiment, the control circuitry may be configured to control the air flow direction device to direct a portion of the flow of pressurized air from the air blowing device to the set of heat transfer channels and a remaining portion of the flow of pressurized air from the air blowing device to the set of heat insulated air flow channels when the temperature level is above the first predetermined threshold limit and below the second predetermined threshold limit.

An advantage is that a precise temperature level can be obtained by the load implement body. For example, the temperature range between the first and second predetermined threshold limits may be set rather narrow.

Accordingly, and according to an example embodiment, the control circuitry may be configured to control the air flow direction device to direct the flow of pressurized air from the air blowing device to the heat insulated air flow channels when the temperature level is above the second predetermined threshold limit.

According to an example embodiment, the control circuitry may be configured to control the air flow direction device to prevent the flow of pressurized air to reach the set of heat transfer channels when the temperature level of the load implement body is above the second predetermined threshold limit.

Hereby, when the temperature level of the load implement body is about to exceed the second predetermined threshold, i.e., an upper limit of the temperature range, a larger portion of the pressurized air is directed into the set of heat insulated air flow channels. When on the other hand the temperature level is about to fall below the first predetermined threshold, i.e., below a lower limit of the range, a larger portion of the pressurized air is directed into the set of heat transfer channels.

According to an example embodiment, each of the plurality of air flow channels may comprise a sound absorbing structure.

When air is heated, there is a risk that the noise level will be increased. An advantage of providing the plurality of air flow channels with a sound absorbing structure is thus that such noise can be reduced, or even vanish.

According to an example embodiment, the sound absorbing structure of the set of heat transfer channels may be a baffle. A baffle is of particular advantage as it is able to reduce noise while at the same time transfer heat. One or more baffles are preferably integrated in each of the heat transfer channels. The heat insulating channels may also comprise a sound absorbing structure in the form of a baffle.

According to an example embodiment, the material transportation system may further comprise an electric machine, wherein the air blowing device is connected to, and operable by, the electric machine.

According to an example embodiment, the material transportation system may further comprise an energy storage system, the energy storage system being electrically connected to the electric machine.

An advantage is that the air blowing device can be operated by using electric power generated during e.g., regenerative braking. Thus, the energy storage system is preferably electrically connected to the electric traction motors propelling the vehicle. During regenerative braking, the regenerated electric power can be supplied to the electric machine for operating the air blowing device. There is thus no need to e.g., drain a battery for generating the heated and pressurized air to heat the load implement body.

Accordingly, and according to an example embodiment, the control unit may be connected to the electric machine, wherein the control circuitry is further configured to receive a signal indicative of a retarder brake operation mode of the working machine, and control the electric machine to operate the air blowing device to deliver the flow of pressurized air when the working machine is operated in the retarder brake operation mode.

According to an example embodiment, the control unit may be connected to the energy storage system, wherein the control circuitry is configured to control the energy storage system to supply electric power to the electric machine, and control the electric machine to operate the air blowing device by electric power received from the energy storage system.

According to an example embodiment, the material transportation system may further comprise an electric brake resistor in the air conduit, the electric brake resistor being arranged in fluid communication between the air blowing device and the air flow direction device, wherein the energy storage system is electrically connected to the electric brake resistor.

Using an electric brake resistor enables for an even further temperature increase of the pressurized air from the air blowing device.

According to a second aspect, there is provided a working machine comprising a material transportation system according to any one of the embodiments described above in relation to the first aspect.

According to an example embodiment, the working machine may further comprise an electric traction motor, wherein the working machine is at least partially propelled by the electric traction motor.

Effects and features of the second aspect are largely analogous to those described above in relation to the first aspect.

According to a third aspect, there is provided a method of controlling a material transportation system for a working machine, the material transportation system comprising an air blowing device arranged in an air conduit, and a load implement body comprising an open box configured to receive a load material, wherein the load implement body comprises a plurality of air flow channels arranged in downstream fluid communication with the air conduit, the plurality of air flow channels comprising a set of heat insulated air flow channels, and a set of heat transfer channels, wherein each air flow channel of the set of heat insulated air flow channels comprises a heat insulating structure, wherein the method comprises determining a temperature level of the load implement body, comparing the temperature level with a predetermined threshold limit; and controlling the flow of pressurized air from the air blowing device to be directed to the set of heat transfer channels when the temperature level of the load implement body is below the predetermined threshold limit.

Effects and features of the third aspect are largely analogous to those described above in relation to the first aspect.

According to a fourth aspect, there is provided a computer program comprising program code means for performing the steps of the third aspect when the program code means is run on a computer.

According to a fifth aspect, there is provided a computer readable medium carrying a computer program means for performing the steps of the third aspect when the program means is run on a computer.

Effects and features of the fourth and fifth aspects are largely analogous to those described above in relation to the first aspect.

Further features of, and advantages will become apparent when studying the appended claims and the following description. The skilled person will realize that different features may be combined to create embodiments other than those 0 described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
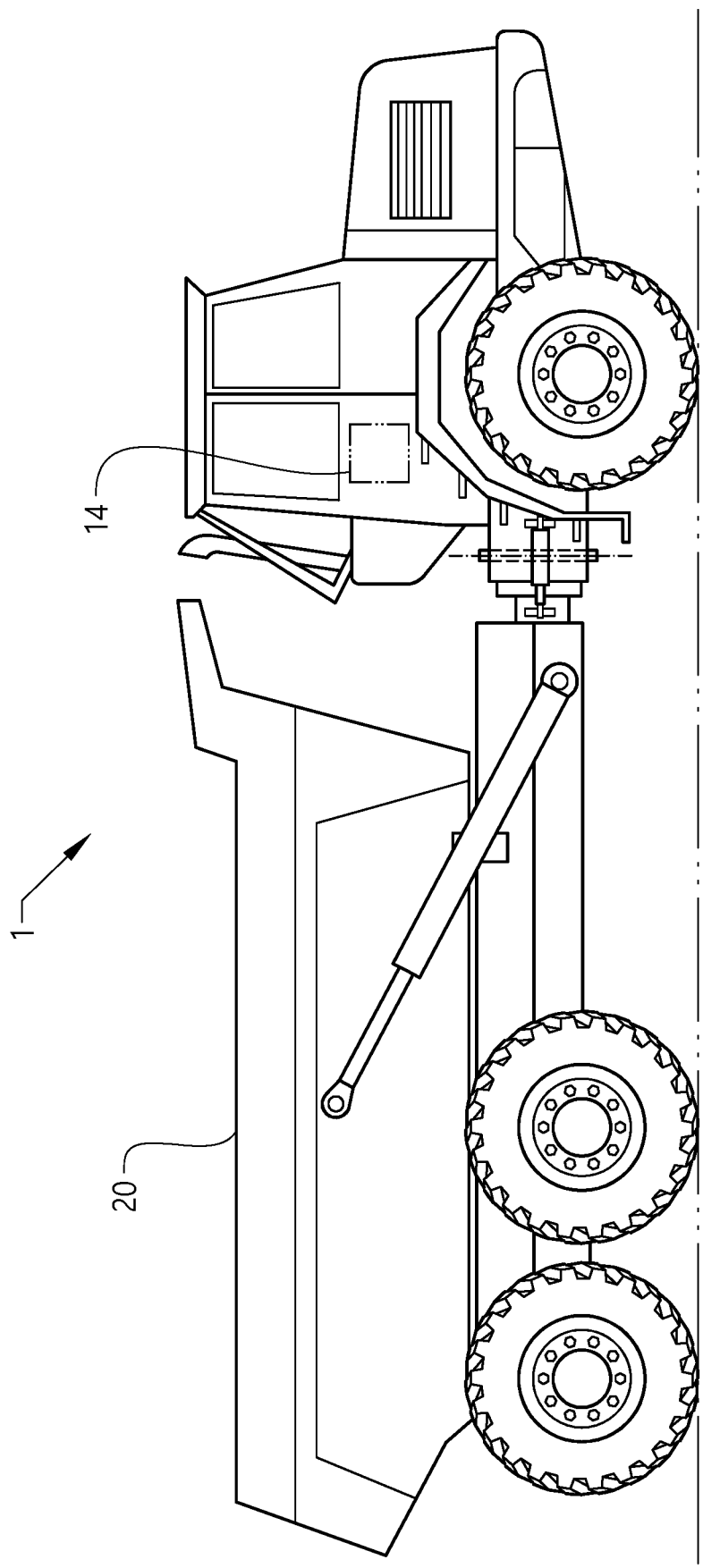
FIG. 1 is a lateral side view illustrating an example embodiment of a working machine in the form of an articulated hauler.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a working machine 1 in the form of an articulated hauler. The working machine 1 comprises a load implement body 20. In the FIG. 1 example, the load implement body 20 is a dump body. The load implement body 20 comprises an open box which is configured to receive a load material, such as e.g. rock fragments, gravel, sand, and the like. Thus, the working machine 1 is arranged to carry material of various kind to different loading and unloading positions. As will be described in further detail below, the load implement body 20 forms part of a material transportation system 100 (illustrated in FIGS. 2 and 4).

The working machine 1 is further provided with a control unit 14. The control unit 14 is configured to control various functionalities of the working machine 1 and forms part of the material transportation system.

The control unit 14 may include a microprocessor, microcontroller, programmable digital signal processor or another programmable device. The control unit 14 may also, or instead, include an application specific integrated circuit, a programmable gate array or programmable array logic, a programmable logic device, or a digital signal processor. Where the control unit 14 includes a programmable device such as the microprocessor, microcontroller or programmable digital signal processor mentioned above, the processor may further include computer executable code that controls operation of the programmable device.

Figure 2:
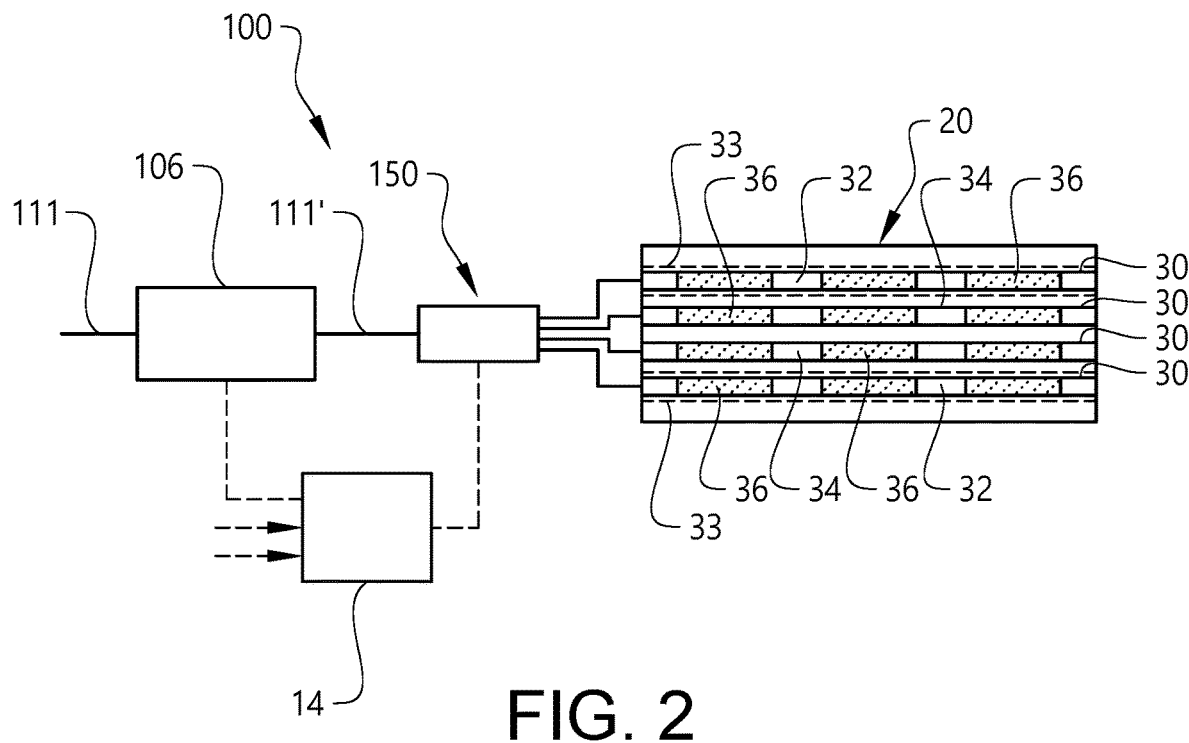
FIG. 2 is a schematic illustration of a material transportation system according to an example embodiment.

In order to describe the material transportation system in further detail, reference is now made to FIG. 2 which is a schematic illustration of the material transportation system 100 according to an example embodiment.

As can be seen in FIG. 2, the material transportation system 100 comprises the above-described load implement body 20 which is arranged to receive and transport material, such as e.g. load material in the form of rocks, gravel, sand, etc. The load implement body 20 comprises a plurality of air flow channels 30. The air flow channels 30 are preferably integrated in the floor of the load implement body 20, i.e. integrated in a vertically lower portion of the load implement body 20. As will be evident from the below disclosure, the plurality of air flow channels 30 are arranged to transport air, and thereby control the temperature level of the floor of the load implement body 20. Side wall portions of the load implement body 20 may also be provided with air flow channels 30. The air flow channels may, according to an example embodiment, extend along the entire longitudinal extension of the load implement body 20. Preferably, each of the plurality of air flow channels 30 comprises an inlet at a longitudinally positioned front portion of the load implement body 20, and an outlet to the ambient environment at a longitudinally positioned end portion of the load implement body 20. Other alternatives are of course conceivable, such as e.g., a plurality of air flow channels 30 arranged at a mid-portion of the load implement body 20. In such a case, only a dedicated portion of the load implement body 20 is subject to thermal exposure from the plurality of air flow channels 30. The load implement body 20 is in FIG. 2 thus a cross section of the floor depicted from below.

The plurality of air flow channels 30 comprises a set of heat insulated air flow channels 32, and a set of heat transfer channels 34. FIG. 2 illustrates two heat insulated air flow channels 32 and two heat transfer channels 34. The plurality of air flow channels 30 may of course contain a further or less heat insulated air flow channels 32 and heat transfer channels 34 than what is depicted in FIG. 2. The heat insulated air flow channels 32 comprises a heat insulating structure 33. The heat insulating structure 33 thus prevents the air directed through the heat insulated air flow channels 32 to be distributed to the structure of the load implement body 20. Hence, when air is solely directed through the heat insulated air flow channels 32, the load material body 20 is not heated, i.e. the temperature level of the load implement body 20 is not heated. The heat insulating structure 33 could be formed by any type of suitable material or composition, as long as it is resistive to high temperatures.

The plurality of air flow channels 30 in the exemplified embodiment depicted in FIG. 2 also comprises a sound absorbing structure 36. The sound absorbing structure 36 reduces the distribution of noise generated in the air flow channels 30. The sound absorbing structure 36 may be formed by a suitable and heat resistive material or component. An example embodiment of a sound absorbing structure 36 in the form of a baffle will be described in further detail below with reference to FIG. 3.

The material transportation system 100 further comprises an air blowing device 106 arranged in an air conduit 111, 111'. In detail, the air blowing device 106 receives air, preferably treated or untreated ambient air from an inlet air conduit 111, pressurizes and heats the air before supplying the pressurized and heated air to an air outlet air conduit 111'. The air blowing device 106 is thus a device which is able to transport the ambient air towards the load implement body 20. The air blowing device 106 can be e.g. a fan, an air compressor, etc. In the following, the air blowing device 106 is referred to as an air compressor 106. The air compressor 106 thus pressurize and heats the ambient air received from the inlet conduit 111 and supplies the pressurized and heated air into the air outlet conduit 111'. As is illustrated in FIG. 2, the air compressor 106 is connected to the control unit 14 and is operated based on operational commands from the control unit 14.

The material transportation system 100 further comprises an air flow direction device 150 in the air conduit at a position downstream the air compressor 106. In detail, the air flow direction device 150 is arranged in the air outlet conduit 111' and receives the pressurized and heated air supplied from the air compressor 106. The air received by the air flow direction device 150 is controllably directed to the plurality of air flow channels 30 of the load implement body 20. In detail, the air flow direction device 150 is connected to the control unit 14 and based on operational commands from the control unit 14, the air flow direction device 150 directs the pressurized and heated air to the set of heat insulated air flow channels and/or to the set of heat transfer channels. The air flow direction device 150 may thus be arranged in the form of a valve arrangement.

The following will now describe the operational functionalities of the material transportation system 100 according to various example embodiments. During operation, the control unit 14 receives a signal indicative of the temperature level of the load implement body 20. The signal may be received from e.g. a temperature sensor (not shown) positioned in the load implement body 20, etc. The control unit 14 compares the temperature level of the load implement body 20 with a predetermined threshold limit. The predetermined threshold limit may be a minimum temperature level of a predetermined temperature range.

When the temperature level of the load implement body 20 is below the predetermined threshold limit, the control unit 14 transmits a signal to the air flow direction device 150 for controlling the air flow direction device 150 to direct the flow of pressurized and heated air from the air compressor 106 to the set of heat transfer channels 34. Preferably, and to heat the load implement body 20 as much as possible, the air flow direction device 150 is controlled to prevent the flow of pressurized and heated air from reaching the set of heat insulated air flow channels 32.

The predetermined threshold limit may be a dynamic threshold limit. In detail, the predetermined threshold limit may be different depending on the specific material being transported in the load implement body, and/or may be based on a current ambient air temperature. In the latter example, the predetermined threshold limit may be set at a higher temperature level when the ambient air temperature is higher compared to when the ambient air temperature is lower.

As indicated above, the predetermined threshold limit may be a maximum temperature level of a predetermined temperature range. In such an example, the predetermined threshold limit is a first predetermined threshold limit, and the temperature range may comprise a second predetermined threshold limit. The second predetermined threshold limit may here correspond to a maximum temperature level of the predetermined range, i.e. a higher temperature level than the first predetermined threshold limit. Preferably, the temperature of the load implement body 20 should be within the predetermined range, i.e. between the first and second predetermined threshold limits.

In order to have a temperature level of the load implement body 20 between the first and second predetermined threshold limits, the control unit 14 may also be configured to control the air flow direction device 150 to direct a portion of the pressurized and heated air to the set of heat transfer channels and a portion of the flow of pressurized and heated air to the set of heat insulated air flow channels. The control unit 14 preferably controls the air flow direction device 150 to control the flow of pressurized and heated air in this manner when the temperature level is between the first and second predetermined threshold limits.

However, when the temperature level of the load implement body 20 is above the second predetermined threshold limit, the temperature is about to exceed a maximum temperature limit. The maximum temperature limit may be a temperature level where the material provided in the load implement body 20 is at risk of being damaged. In such a case, the control unit 14 controls the air flow direction device 150 to direct the flow of pressurized and heated ambient air to the set of heat insulated air flow channels 32. Preferably, the air flow direction device 150 is controlled to prevent pressurized and heated air from reaching the set of heat transfer channels 34. In this way, the temperature level of the material in the load implement body can be reduced to a desired temperature level.

As will also be evident from the below disclosure in relation to FIG. 4, the air compressor is driven by electric power, either by directly receiving electric power for propulsion thereof, or via an electric machine controlling the operation of the air compressor. During regenerative braking of the vehicle, the electric power generated during this braking mode can be supplied to the air compressor. Hereby, the air compressor 106 receives electric power without e.g., draining an energy storage system of the vehicle, such as e.g., a battery or the like, and can hereby efficiently pressurize and heat the ambient air for heating the load implement body. Preferably, the load implement body 20 is heated as much as possible, without exceeding the second predetermined threshold limit when the vehicle is exposed to regenerative braking. The load implement body 20 is thus receiving a buffer of relatively high temperature. However, should the vehicle not be operated in a regenerative braking mode, and the temperature of the load implement body 20 falls below the first predetermined threshold limit, the air compressor 106 can be controlled by receiving electric power from the battery. In such a case, the battery is temporarily drain from electric power until the temperature level of the load implement body exceeds the first predetermined threshold limit.

Figure 3:
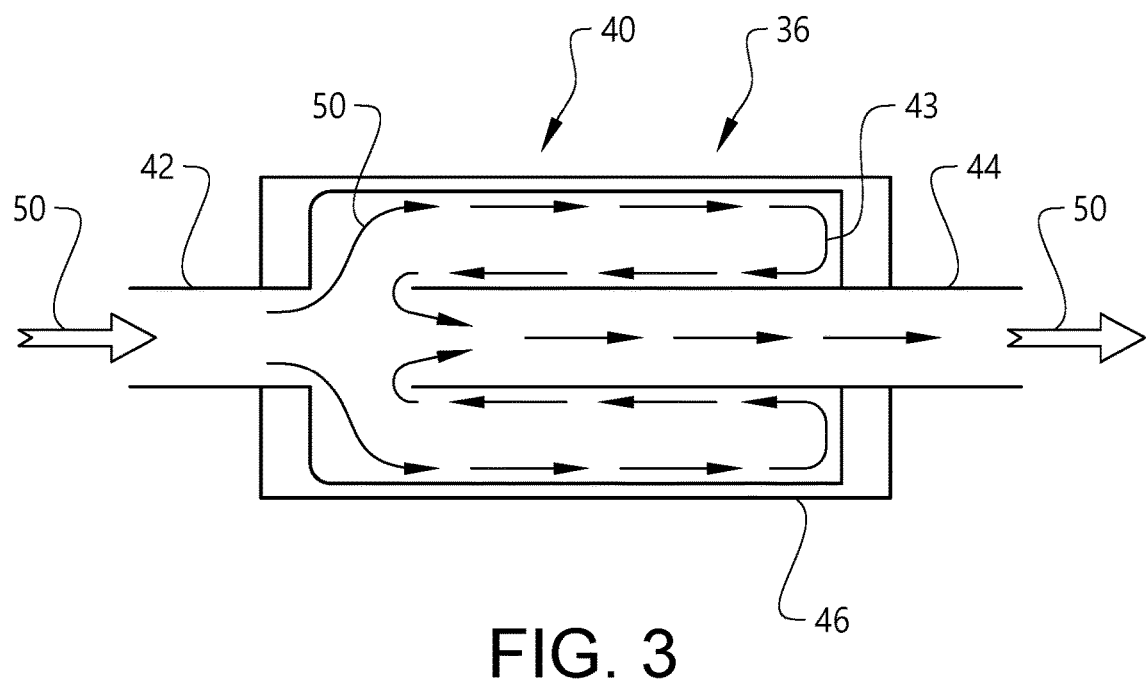
FIG. 3 is a schematic illustration of a sound absorbing structure in the form of a baffle according to an example embodiment.

In order to describe an example embodiment of the above described sound absorbing structure 36, reference is made to FIG. 3. FIG. 3 is a schematic illustration of a sound absorbing structure 36 in the form of a baffle 40. The baffle 40 illustrated in FIG. 3 should be construed as a non-limit example and can be designed in a variety of ways.

The exemplified baffle 40 in FIG. 3 comprises a baffle inlet tube 42 and a baffle outlet tube 44. Pressurized and heated air 50 is thus entering the baffle 40 through the baffle inlet tube 42 and is exhausted form the baffle 40 through the baffle outlet tube 44. The baffle 40 comprises an outer cylinder 46. The baffle inlet tube 42 is extending into the outer cylinder 46 and has an increased tube diameter within the outer cylinder 46. The baffle outlet tube 44 also extends into the outer cylinder 46. In further detail, and as illustrated in FIG. 3, the baffle outlet tube 44 also extends into the portion of the baffle inlet tube 42 having the increased diameter. The baffle inlet tube 42 is thus enclosed within the outer cylinder 46. Similarly, the baffle outlet tube 44 is at least partly housed by the baffle inlet tube 42.

Pressurized and heated air 50 is directed into the baffle 40 through the baffle inlet tube 42. Within the baffle, the pressurized and heated air 50 is directed in the longitudinal direction of the baffle to circulated between the baffle inlet tube 42 and the baffle outlet tube 44. When arriving at a longitudinal end portion 43 of the baffle inlet tube 42, the pressurized and heated air is changing direction and is flowing towards the inlet of the baffle. Before reaching the inlet, the pressurized and heated air is, again, changing direction and enters the baffle outlet pipe 44 and exhausted out from the baffle 40. The configuration of the baffle 40 depicted in FIG. 3 will hereby efficiently reduce emission of noise.

Figure 4:
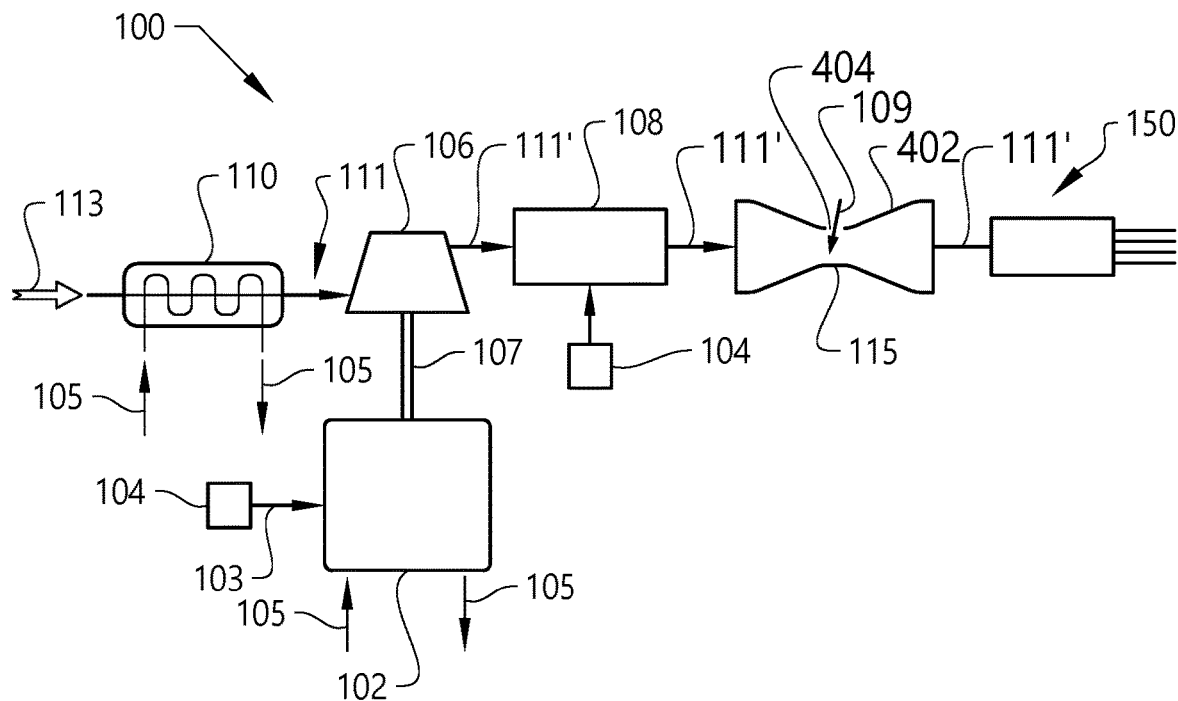
FIG. 4 is a schematic illustration of a material transportation system according to another example embodiment.

Reference is now made to FIG. 4 in order to describe the material transportation system 100 according to an example embodiment. The FIG. 4 example is a further detailed illustration of components that may form part of the material transportation system 100. The embodiment in FIG. 4 only describes the components arranged upstream the air flow direction device 150. The functional operation of the material transportation system 100 in FIG. 4 is thus the same as described above in relation to FIG. 2. The control unit 14 is omitted from FIG. 4 and the following description but should be construed as also being incorporated in this example embodiment.

As can be seen in FIG. 4, the material transportation system 100 comprises an electric machine 102 arranged to receive electric power 103 from an electric source 104. The electric source 104 can be, for example, a vehicle battery or a fuel cell system. The electric source 104 can, as another option, be formed by an electric inverter, or other electric machine, etc. Thus, the purpose of the electric source is to supply electric power to the electric machine. The electric source can, according to an example, also be arranged to receive electric power from a traction motor of the vehicle. Moreover, the electric machine 102 can also be connected to a cooling system 105 of the vehicle 10. The cooling system 105 may either be a liquid cooling system or an air-cooling system.

The material transportation system 100 further comprises the above described air compressor 106, which here is mechanically connected to, and operated by, the electric machine 102. Preferably, the air compressor 106 is mechanically connected to the electric machine 102 by a shaft 107.

The material transportation system 100 further comprises an air heating arrangement 108, 110. In FIG. 4, the air heating arrangement 108, 110 is illustrated and described as an electric air heating arrangement 108 and a heat exchanger 110. It should however be readily understood that the material transportation system 100 may comprise only one of the electric air heating arrangement 108 and the heat exchanger 110. Thus, one of the electric air heating arrangement 108 and the heat exchanger 110 can be omitted in the material transportation system 100 but are both illustrated for simplifying the description of the present embodiment.

The electric air heating arrangement 108 may be arranged in the outlet air conduit 111' at a position downstream the air compressor 106, i.e. for receiving pressurized air from the air compressor 106. The electric air heating arrangement 108 is connected to the electric source 104. In FIG. 4, the electric source 104 is depicted as two components for simplicity of understanding. It should be readily understood that the electric source could be either a single component or separate components.

The electric air heating arrangement 108 is preferably implemented in the form of an electric brake resistor arrangement comprising an electric brake resistor. The electric air heating arrangement 108 thus receives the pressurized air from the air compressor 106, whereby the air is heated in the electric air heating arrangement by the electric power received from the electric source 104. The air is thereafter preferably supplied towards the air flow direction device 150.

According to an example embodiment, the electric air heating arrangement may be an air cooled electric air heating arrangement, such as an air cooled electrical brake resistor. The electric air heating arrangement is thus cooled by the air it receives from the air flow producing unit when receiving electric power. Other alternatives are also conceivable.

Further, the heat exchanger 110 is arranged in upstream fluid communication with the air compressor 106 in the inlet air conduit 111. The heat exchanger 110 is in FIG. 4 arranged as a heat exchanger connected to the cooling system 105 of the working machine 1. Thus, the heat exchanger receives liquid fluid from the cooling system 105 and pre-heats the air before it is delivered to the air compressor 106. The heat exchanger 110 is thus preferably an air-to-liquid heat exchanger but may, as an alternative, be an air-to-air heat exchanger which uses relatively warm air to heat the air that is supplied to the air compressor 106. As a not depicted alternative, the heat exchanger 110 may be replaced by the electric machine 102. In such a case, the electric machine receives the air, and pre-heats the air before the air is supplied to the air compressor 106. The heat exchanger 110 may also be arranged at other positions of the material transportation system 100 than what is depicted in FIG. 4. For example, the heat exchanger 110 may be in the outlet air conduit 111' downstream the air compressor 106.

Furthermore, the material transportation system 100 comprises a flow injecting arrangement 402 positioned in the outlet air conduit 111'. The flow injecting arrangement 402 is arranged in downstream fluid communication with the air compressor 106, i.e. the flow injecting arrangement 402 receives the pressurized air exhausted from the air compressor 106. Although not depicted in detail in FIG. 4, the flow injecting arrangement 402 comprises a portion configured to admit a flow of fluid into the flow of air exhausted from the air compressor 106. As can be seen in FIG. 4, the flow injecting arrangement 402 is arranged in the form of a venturi arrangement comprising a constricted portion 115. The constricted portion 115 is arranged as a reduced diameter of the venturi arrangement in which the flow velocity of the flow of air from the air compressor 106 will increase. The portion configured to admit the flow of fluid into the venturi arrangement is preferably arranged at the constricted portion 115 of the venturi arrangement. As can be seen in FIG. 4, the portion is arranged as an orifice 404 in which a flow of fluid 109 can enter the constricted portion 115. According to the example embodiment depicted in FIG. 4, the venturi arrangement 402 is arranged in downstream fluid communication with the electric air heating arrangement 108. It should however be readily understood that the venturi arrangement 402 is arranged in upstream fluid communication with the electric air heating arrangement 108, i.e., between the air compressor 106 and the electric air heating arrangement 108.

Although not illustrated in the figures, the material transportation system 100 may comprise further features, such as a flow restriction arrangement positioned in the outlet air conduit 111'. Such flow restriction arrangement can advantageously increase the pressure level of the flow of air in the outlet air conduit 111'. The flow restriction arrangement is preferably arranged downstream the air compressor 106. The material transportation system 100 may also comprise a muffler in the outlet air conduit 111' at a position between the air compressor 106 and the valve arrangement 150.

Figure 5:
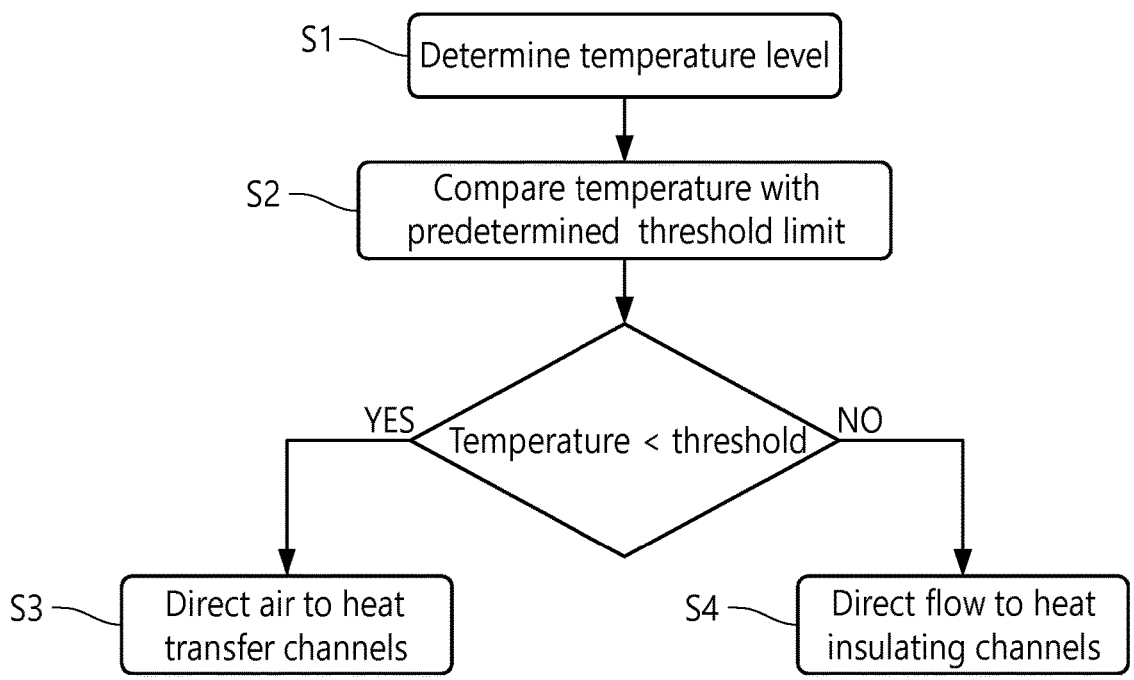
FIG. 5 is a flow chart of a method of controlling the material transportation system according to an example embodiment.

In order to sum up, reference is made to FIG. 5 which is a flow chart of a method of controlling the above-described vehicle energy management system 100 according to an example embodiment.

During operation of the vehicle energy management system 100, the control unit 14 determines S1 a temperature level of the load implement body 20. The control unit 14 compares S2 the temperature level with a predetermined threshold limit as described above in relation to the description of FIG. 2. Thereafter, and when the temperature level of the load implement body 20 is below the predetermined threshold limit, the control unit 14 controls S3 the pressurized air exhausted from the air compressor 106 to be directed to the set of heat transfer channels 34. The flow of pressurized air is, as described above, preferably directed to the set of heat transfer channels 34 by controlling the air flow directing device 150.

On the other hand, if the temperature level is above the predetermined threshold limit, the control unit 14 can control S4 the flow of pressurized air to be directed to the set of heat insulated air flow channels 32. As an alternative, when the temperature level is above the predetermined threshold limit, the flow of pressurized air can be directed to both the set of heat transfer channels 34 and the set of heat insulated air flow channels 32. As a still further alternative, the air compressor may be shut off to not produce a flow of pressurized air at all when the temperature level is above the predetermined threshold limit. Further alternatives are described above in relation to FIG. 2.

It is to be understood that the present disclosure is not limited to the embodiments described above and illustrated in the drawings; rather, the skilled person will recognize that many changes and modifications may be made within the scope of the appended claims.

The invention claimed is:

1. A material transportation system for a working machine, the material transportation system comprising:
an air blowing device arranged in an air conduit;
a load implement body comprising an open box structure configured to receive a load material, wherein the load implement body comprises a plurality of air flow channels arranged in downstream fluid communication with the air conduit, the plurality of air flow channels comprising a set of heat insulated air flow channels, and a set of heat transfer channels, wherein each air flow channel of the set of heat insulated air flow channels comprises a heat insulating structure;
an air flow direction device, the air flow direction device being arranged in the air conduit in fluid communication between the air blowing device and the plurality of air flow channels of the load implement body, wherein the air flow direction device is configured to controllably direct a flow of pressurized air from the air blowing device to the set of heat insulated air flow channels and/or to the set of heat transfer channels; and
a control unit connected to the air flow direction device, the control unit comprising control circuitry configured to:
receive a signal indicative of a temperature level of the load implement body;
compare the temperature level with a predetermined threshold limit; and
control the air flow direction device to direct the flow of pressurized air from the air blowing device to the set of heat transfer channels when the temperature level of the load implement body is below the predetermined threshold limit.

2. The material transportation system according to claim 1, wherein the control circuitry is further configured to:
receive a signal indicative of an ambient air temperature; and
adjust the predetermined threshold limit based on the ambient air temperature.

3. The material transportation system according to claim 1, wherein the predetermined threshold limit is a first predetermined threshold limit, the control circuitry being further configured to:
compare the temperature level with a second predetermined threshold limit, the second predetermined threshold limit being higher than the first predetermined threshold limit.

4. The material transportation system according to claim 3, wherein the control circuitry is configured to:
control the air flow direction device to direct a portion of the flow of pressurized air from the air blowing device to the set of heat transfer channels and a remaining portion of the flow of pressurized air from the air blowing device to the set of heat insulated air flow channels when the temperature level is above the first predetermined threshold limit and below the second predetermined threshold limit.

5. The material transportation system according to claim 3, wherein the control circuitry is configured to:
control the air flow direction device to direct the flow of pressurized air from the air blowing device to the set of heat insulated air flow channels when the temperature level is above the second predetermined threshold limit.

6. The material transportation system according to claim 3, wherein the control circuitry is configured to:
control the air flow direction device to prevent the flow of pressurized air to reach the set of heat transfer channels when the temperature level of the load implement body is above the second predetermined threshold limit.

7. The material transportation system according to claim 1, wherein each of the plurality of air flow channels comprises a sound absorbing structure.

8. The material transportation system according to claim 1, further comprising an electric machine, wherein the air blowing device is connected to, and operable by, the electric machine, and an energy storage system electrically connected to the electric machine, the control unit being connected to the electric machine, wherein the control circuitry is further configured to:

receive a signal indicative of a retarder brake operation mode of the working machine; and control the electric machine to operate the air blowing device to deliver the flow of pressurized air when the working machine is operated in the retarder brake operation mode.

9. The material transportation system according to claim 8, wherein the control unit is connected to the energy storage system, the control circuitry being further configured to:

control the energy storage system to supply electric power to the electric machine; and control the electric machine to operate the air blowing device by electric power received from the energy storage system.

10. The material transportation system according to claim 8, wherein the material transportation system further comprises an electric brake resistor in the air conduit, the electric brake resistor being arranged in fluid communication between the air blowing device and the air flow direction device, wherein the energy storage system is electrically connected to the electric brake resistor.

11. A working machine comprising a material transportation system according to claim 1.

12. The working machine according to claim 11, wherein the working machine further comprises an electric traction motor, the working machine being at least partially propelled by the electric traction motor.

13. A method of controlling a material transportation system for a working machine, the material transportation system comprising:

an air blowing device arranged in an air conduit; and a load implement body comprising an open box configured to receive a load material, wherein the load implement body comprises a plurality of air flow channels arranged in downstream fluid communication with the air conduit, the plurality of air flow channels comprising a set of heat insulated air flow channels, and a set of heat transfer channels, wherein each air flow channel of the set of heat insulated air flow channels comprises a heat insulating structure, wherein the method comprises:

determining a temperature level of the load implement body;

comparing the temperature level with a predetermined threshold limit; and controlling the flow of pressurized air from the air blowing device to be directed to the set of heat transfer channels when the temperature level of the load implement body is below the predetermined threshold limit.

14. A non-transitory computer readable medium carrying instructions for performing the steps of claim 13 when the instructions are executed on a computer.

* * * * *